United States Patent [19]

Herden

[11] 4,254,395
[45] Mar. 3, 1981

[54] ELECTROMECHANICAL FORCE CONVERTER FOR MEASURING GAS PRESSURE

[75] Inventor: Werner Herden, Stuttgart, Fed. Rep. of Germany

[73] Assignee: Robert Bosch GmbH, Stuttgart, Fed. Rep. of Germany

[21] Appl. No.: 107,274

[22] Filed: Dec. 26, 1979

[51] Int. Cl.³ .................... H01L 10/10; H01L 43/02
[52] U.S. Cl. ..................................... 338/42; 338/36; 338/41
[58] Field of Search ............... 338/32 H, 42, 13, 36, 338/41; 73/728, 722; 361/178

[56] References Cited

U.S. PATENT DOCUMENTS

| 3,761,958 | 9/1973 | Nishira | 338/42 X |
| 4,077,262 | 3/1978 | Cholet | 73/722 |
| 4,187,444 | 2/1980 | Gerard | 335/302 X |

FOREIGN PATENT DOCUMENTS

| 2241085 | 3/1974 | Fed. Rep. of Germany | 73/728 |
| 2726312 | 12/1978 | Fed. Rep. of Germany | 73/728 |
| 310145 | 9/1971 | U.S.S.R. | 73/728 |

Primary Examiner—C. L. Albritton
Attorney, Agent, or Firm—Frishauf, Holtz, Goodman & Woodward

[57] ABSTRACT

A Hall-effect sensor unit producing an electrical output is located between two permanent magnets of opposed polarity. The magnetic induction detected by the sensor unit is caused to vary with the pressure by variation of the spacing between the sensor unit and one or both magnets, or by variable introduction of a magnetically soft member between the sensor unit and one of the magnets, the motion being produced in each case by a membrane or a variable volume chamber which produces displacement in proportion to gas pressure to be sensed. The force converter is particularly designed to provide a highly linear pressure measurement signal for the air intake condition of an internal combustion engine.

5 Claims, 6 Drawing Figures

U.S. Patent   Mar. 3, 1981   Sheet 1 of 2   4,254,395
FIG 1
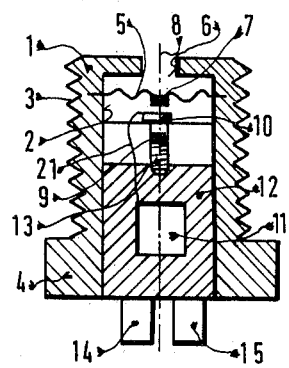
FIG 2
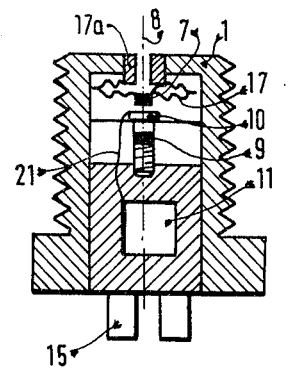
FIG 3   $P \gtrless 0$
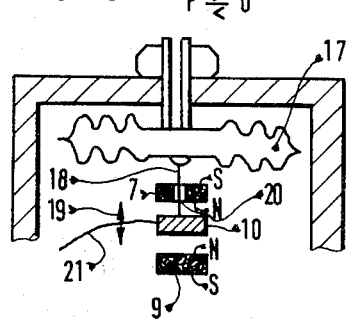
FIG 4   $P \gtrless 0$
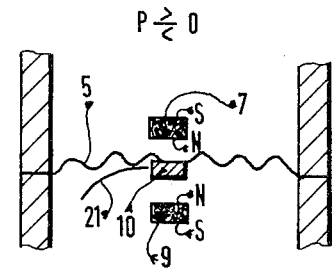
FIG 5
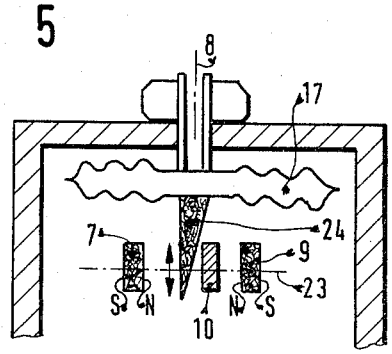

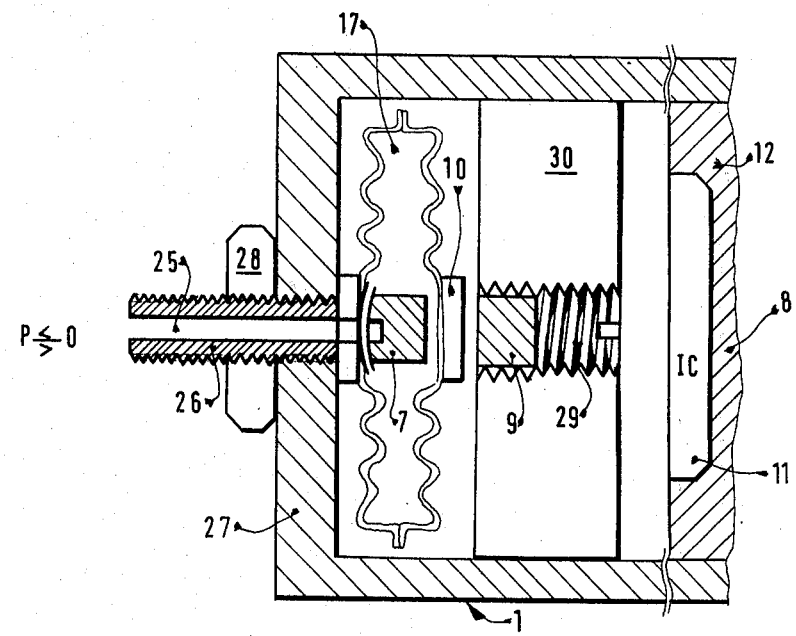

ELECTROMECHANICAL FORCE CONVERTER FOR MEASURING GAS PRESSURE

This invention concerns an electromechanical force converter for the measurement of pressure by producing an electrical signal representative of the pressure of a gas, and more particularly for the measurement of the intake vacuum of an internal combustion engine by an arrangement comprising a membrane, which alters its positions in accordance with pressure, a Hall-effect sensor unit and a permanent magnet.

Known force converters of this type, for example, those disclosed in German OS 16 73 938, have a permanent magnet provided in an iron magnetic path in which a semiconductor component operating as a Hall generator dependent upon the magnetic field is located and also an air gap in which a regulating piece projects and modifies the lines of force in the air gap. Such converters, however, require very high precision in manufacture and installation and furthermore have the disadvantage that they can be protected against interference from dirt and grime in operation in a motor vehicle only with substantial difficulty and expense.

It is an object of the present invention to provide a force converter particularly suited for the measurement of the air intake vacuum of an internal combustion engine, which in spite of simple construction has a high precision and reproducibility of the pressure values measured.

SUMMARY OF THE INVENTION

Briefly, two permanent magnets are provided on opposite sides of the Hall-effect generator and the magnets have their respective poles of the same polarity facing each other. Preferably the permanent magnets are of a known constitution of a combination of cobalt and one or more rare earth elements, preferably of cobalt and samarium, especially the intermetallic compound $Co_5Sm$ in at least approximately stoichiometric ratio. In a useful embodiment of the invention, a first permanent magnet is provided on the membrane, between the membrane and the Hall generator. In another useful embodiment of the invention, both magnets are in fixed position, in which case it is particularly useful to mount the Hall generator on the membrane. Instead of mounting the Hall generator movably, however, it may be fixed as well as the magnet if a piece of magnetically soft material is mechanically connected with the membrane, so that it extends between the Hall generator and one of the two fixed magnets.

In some embodiments, the membrane encloses a chamber at least in part, in which case one of the permanent magnets may be fixed in position inside the chamber.

BRIEF DISCRIPTION OF THE DRAWINGS

The invention is further described by way of illustrative examples, with reference to the annexed drawings, in which:

FIG. 1 is a diagrammatical cross-section of a first embodiment of the invention;

FIG. 2 is a diagrammatic cross-section of a second embodiment of the invention;

FIG. 3 is a diagrammatic cross-section, partly broken away, of a third embodiment of the invention;

FIG. 4 is a diagrammatic cross-section, partly broken away, of a fourth embodiment of the invention;

FIG. 5 is a diagrammatic cross-section, partly broken away, of a fifth embodiment of the invention, and FIG. 6 is a diagrammatic cross-section, partly broken away, of a sixth embodiment of the invention.

DESCRIPTION OF THE ILLUSTRATIVE EMBODIMENTS

The force converter shown in FIG. 1 is designed to be built into the air-intake pipe of a vehicular motor that is not shown in the drawing. It comprises a metallic casing 1 with a central longitudinal bore 2 and external screw-threading for screwing the pressure converter into the wall of the air-intake pipe. For such insertion, a hexagonal flange 4 is provided on the lower end section of the casing 1.

Inside the casing 1 is a corrugated membrane 5 clamped at its edges where it joins the walls of the bore 2. The membrane 5 carries, on its bottom side that faces away from a central inlet aperture 6, a squat cylindrical permanent magnet 7 made of a cobalt-rare-earth compound. The magnet 7 moves in the direction of the longitudinal axis 8 of the force converter in response to varying pressures operating on the membrane 5. This upper permanent magnet 7 is opposite to a second permanent magnet 9 located at a small axial spacing from the first and also centered on the longitudinal axis 8. The magnet 9 is of the same kind of material as the magnet 7, and preferably both are made of a well-known cobalt and samarium permanently magnetic composition. Both magnets 7 and 9 are magnetized in the direction of the longitudinal axis already mentioned in such a manner that their opposing end faces have the same polarity.

More or less in the middle between the two magnets, the Hall generator element 10 is provided that in a preferred form in a part of a monolithic integrated semiconductor circuit (IC), which comprises, in addition to the Hall generator, a constant current source, an amplifier and provisions for temperature compensation. The integrated circuit delivers an output voltage which is proportional to the magnetic induction present at the location of the Hall generator, which voltage is supplied then to an evaluation or processing circuit symbolically shown at 11. The processing circuit makes possible calibration or equalization and permits the adjustment of the zero point and of the slope in such a manner that a particular linear characteristic region will be traversed by the axial movement of the upper permanent magnet. The evaluation or processing circuit 11 can be made in the form of a so-called hybrid circuit (i.e. containing discrete components mounted on a unitary circuit) and, in the illustrated example, is mounted in a damping mass 12 of elastic material of the rubber type, for protection against the effects of vibration. The lower permanent magnet 9, serving for compensation, is seated on the free end of a positioning screw 13 that enables the magnet 9 to be axially adjusted to fix the point of zero induction. In this manner, it is directly possible to obtain an approximately linear relation between the pressure acting on the membrane 5 and the output voltage with a maximum displacement of the upper permanent magnet 7 of about 0.5 mm. On the underside of the casing, three electrical connection contacts are provided, of which only the two contacts 14 and 15 are shown in the drawing.

The particular advantage of the pressure converter results from the following factors:

1. The position of magnetic induction B=0 lies in the middle between the two magnets 7 and 9.

2. The place of induction B=0 is readily adjustble mechanically by displacement of the compensation magnet 9, particularly if the screw 13 is provided with fine threading.

3. The control signal can proceed from B=0 as reference, which results in operation in the favorably linear region of the Hall-IC.

4. The recognition of overpressure and underpressure is provided in a simple fashion, by whether B>0 or B<0.

5. By displacement in the region of null induction, a very high linearity of the dependence of the output voltage on the induction is provided.

6. Since no background induction (offset) is present, high amplification is possible, and in consequence, high precision.

7. By affixation of the first magnet to the membrane, all mechanical guiding for the magnets is dispensed with.

FIG. 2 shows another embodiment of the invention in which the pressure converter utilizes a pressure chamber 17 with corrugated flexible walls instead of a single membrane, the upper magnet 7 being affixed on the underside of the chamber. Parts that are the same as or have the same function as those of FIG. 1 are designated by the same reference numerals. The chamber 17 communicates with the interior of the engine intake pipe through its mounting bushing 17a. The remaining components of this second embodiment are like those of FIG. 1.

In the embodiment shown in FIG. 3, the pressure chamber 17 is again utilized. In this case the holder rod 18 is affixed to the underside of the chamber 17 on which the Hall-IC 10 is seated and is moved up or down in the direction of the arrows 19 with changing pressure P. The upper permanent magnet 7, like the lower permanent magnet 9, is fixed in position, the upper magnet having a central passage bore 20 for the holder rod 18.

FIG. 4 shows still another embodiment of a pressure converter according to the invention, utilizing a membrane 5 which in contrast to that of FIG. 1, carries the Hall-IC 10 on its underside. The upper component magnet 7 is above the membrane 5. The lower magnet 9 below the membrane 5 has the same axial spacing from the Hall-IC 10 as the upper permanent magnet 7 in the rest position (no intake underpressure or overpressure). As in the embodiments described above, this IC is connected by flexible leads 21 to an evaluation or processing circuit designated 11 as in FIGS. 1 and 2.

In the illustrative embodiment shown in FIG. 5, the two permanent magnets 7 and 9 are arranged coaxially with the Hall-IC 10 on a cross axis 23 perpendicular to the longitudinal axis 8, at fixed spacings and orientation. For pressure-dependent influencing of the magnetic induction effective at the location of the Hall-IC 10, a magnetically soft wedge-shaped armature piece 24 is provided on the underside of the pressure chamber 17 which extends more or less deeply through the intermediate space between the left permanent magnet 7 and the Hall-IC 10, moving in the direction of the arrows 25 parallel to the longitudinal axis 8 of the pressure converter when the pressure is to be measured changes.

The advantages set forth in connection with the device of FIG. 1 apply also to the embodiments according to FIGS. 2 to 5.

The embodiments shown in FIGS. 3 and 4, as the result of the fact that only the Hall element is moved by a membrane or membranic chamber, have the advantage of a particularly good linearity of the output voltage as a function of the pressure.

The illustrative embodiment shown in FIG. 6 is a preferred form of the apparatus of the invention. There, just as in FIGS. 3 and 5, a pressure chamber 17 is provided which is seated on a threaded bushing 26 having a longitudinal bore 25. The bushing 26 can be turned to insert it more or less deeply into the bore 27 of the casing 1 for adjustment of the chamber 17 and can be fixed into the adjusted position by means of a counternut 28. On the inside of the membrane of the pressure chamber 17 which is connected to the threaded bushing, the first Co Sm magnet 7 is mounted in fixed position relative to the casing 1. This magnet is set with a polarity opposing that of the second Co Sm magnet 9, which is to say that like poles are facing each other. The magnet 9 is seated on an adjustable threaded stud 29 which is screwed into a tapped bore in a transverse partition or strut 30. The Hall element 10 is disposed between the two magnets 7 and 9 and affixed in the center on the membrane of the chamber 17 which faces away from the magnet 7. An integrated circuit unit 11 for processing or evaluation of the voltage delivered by the Hall-effect unit 10 is located on an extension of the axis 8, mounted by means of a damping mass 12.

The embodiment illustrated in FIG. 6 offers the following advantages:

1. Very good linearity, since the Hall element 10 is caused to move and the two magnets 7 and 9 are fixed in their spatial position.

2. The use of a pressure chamber of the membrane type is more favorable than a single membrane with regard to linearity and precision.

3. The device lends itself readily to simple manufacturing procedures.

The embodiments according to FIGS. 2, 3, 5 and 6, utilizing a corrugated membrane pressure chamber 17 can of course be utilized to measure absolute pressure instead of differential pressure if the chamber 17 is sealed and exposed only to the pressure to be measured, instead of being exposed on the interior to the pressure to be measured and on the exterior to atmospheric pressure. It will thus be seen that, although the invention has been described with reference to particular illustrative embodiments, variations and modifications are possible within the inventive concept.

Among the several rare earth elements other than samarium known to make useful permanently magnetic materials in combination with cobalt, lanthanum may be mentioned as an example.

I claim:

1. Electromechanical force converter for measuring pressure by an electrical signal, comprising:

a membrane exposed to the pressure to be measured;

a Hall-effect sensor unit, and a first and a second permanent magnet formed of an alloy of cobalt and a rare earth element of which the combined magnetic field produces an electrical voltage in the sensor unit that changes in dependence on the said pressure, said magnets (7,9) having their respective poles of the same polarity facing each other and said second magnet (9) being located on the side of said Hall-effect sensor unit (10) facing away from said first magnet (7).

2. Force converter as defined in claim 1, in which said magnets (7,9) are formed of a cobalt-samarium alloy of at least approximately the composition of the intermetallic compound $Co_5Sm$.

3. Electromechanical force converter for measuring pressures by an electrical signal, comprising:
   a member exposed to the pressure to be measured;
   a Hall-effect sensor unit;
   a first and a second permanent magnet of which the combined magnetic field produces an electrical voltage in the sensor unit that changes in dependence on the said pressure, said second magnet (9) being located on the side of said Hall-effect sensor unit (10) facing away from said first magnet (7) and said magnets (7,9) having their respective poles of the same polarity facing each other, and
   a firm support structure for said membrane and said magnets to which both magnets are firmly affixed.

4. Force converter as defined in claim 3, in which said sensor unit is also in fixed position relative to said support structure and in which a magnetically soft piece (24) is connected to said membrane (5,17) and is thereby disposed so as to project between said sensor unit (10) and one of said fixed permanent magnets (7,9).

5. Force converter as defined in claim 3, in which said membrane forms at least part of the wall of a chamber and in which said first magnet (7) is located in a fixed position within said chamber.

* * * * *